United States Patent [19]

Crump et al.

[11] 4,169,427

[45] Oct. 2, 1979

[54] CABLE CLEANING UNIT

[76] Inventors: Desmond G. Crump, 147 Hale Rd., Wembley Downs, Western Australia; William G. Cornish, 176 Cobb St., Doubleview, Western Australia; Hyem G. Same, 62 Lonsdale St., Yokine, Western Australia

[21] Appl. No.: 868,715

[22] Filed: Jan. 11, 1978

Related U.S. Application Data

[63] Continuation of Ser. No. 676,974, Apr. 14, 1976, abandoned.

[51] Int. Cl.² ............................ B05B 1/04; B05B 3/18
[52] U.S. Cl. .............................. 118/307; 118/DIG. 11; 134/172; 134/199; 184/15 R
[58] Field of Search ....... 118/307, DIG. 11, DIG. 12; 134/172, 173, 199; 184/15 R

[56] References Cited

U.S. PATENT DOCUMENTS

| | | | |
|---|---|---|---|
| 2,023,709 | 12/1935 | Steensen | 134/173 X |
| 2,347,392 | 4/1944 | Bouget | 134/199 X |
| 2,578,260 | 12/1951 | McPherson et al. | 184/15 R |
| 2,858,555 | 11/1958 | Medovick | 118/307 X |
| 3,916,925 | 11/1975 | Crump | 118/307 X |

*Primary Examiner*—Robert Mackey
*Attorney, Agent, or Firm*—Haseltine, Lake & Waters

[57] ABSTRACT

A cable cleaning unit comprising a chamber adapted to surround a section of the cable to be cleaned, a plurality of outlets located within the chamber through which jets of high pressure fluid are directed onto the surface of the cable and mechanism for withdrawing fluid from the chamber. A traction unit for moving the cleaning unit along the cable to be cleaned is also disclosed.

5 Claims, 12 Drawing Figures

CABLE CLEANING UNIT

This is a continuation of application Ser. No. 676,974 filed Apr. 14, 1976, now abandoned.

BACKGROUND OF INVENTION

All cable cleaning units at present in use utilise brushes which brush the external rust and scale and caked external lubricant from the cable. Because such units are bulky, it is necessary that the cleaning operation be carried out at ground level which means that the cable must be first removed from the equipment and then replaced.

OBJECT OF INVENTION

The object of the present invention is to provide a cable cleaning unit which does not require the use of brushes, which can be used for cleaning the cable in situ, which ensures that the strands of the cable are adequately lubricated and which is a development of the invention described and claimed in British patent application No. 7579/74, equivalent to U.S. Pat. No. 3,916,925.

It is also an object of the invention to provide a traction unit for moving the cleaning unit or other cable treatment equipment along a cable.

DESCRIPTION OF INVENTION

The present invention provides a cable cleaning unit comprising an annular nozzle chamber for surrounding a section of cable to be cleaned, a plurality of nozzles within the chamber for directing jets of high pressure oil onto the surface of the cable at an acute angle and a spin-off chamber for receiving oil and impurities from the cable, said spin-off chamber having a plurality of turbo-vanes for directing the oil and impurities to an outlet from the unit.

Further, according to the present invention, there is provided a traction unit comprising a pair of pulley wheels forming between them a gap for a cable, and means for driving at least one of the pulley wheels to drive the traction unit along a cable. The traction unit is preferably provided with two pairs of pulley wheels.

The various features of the invention will be better understood by reference to the following description of the embodiments shown in the accompanying drawings wherein.

Figure 1:
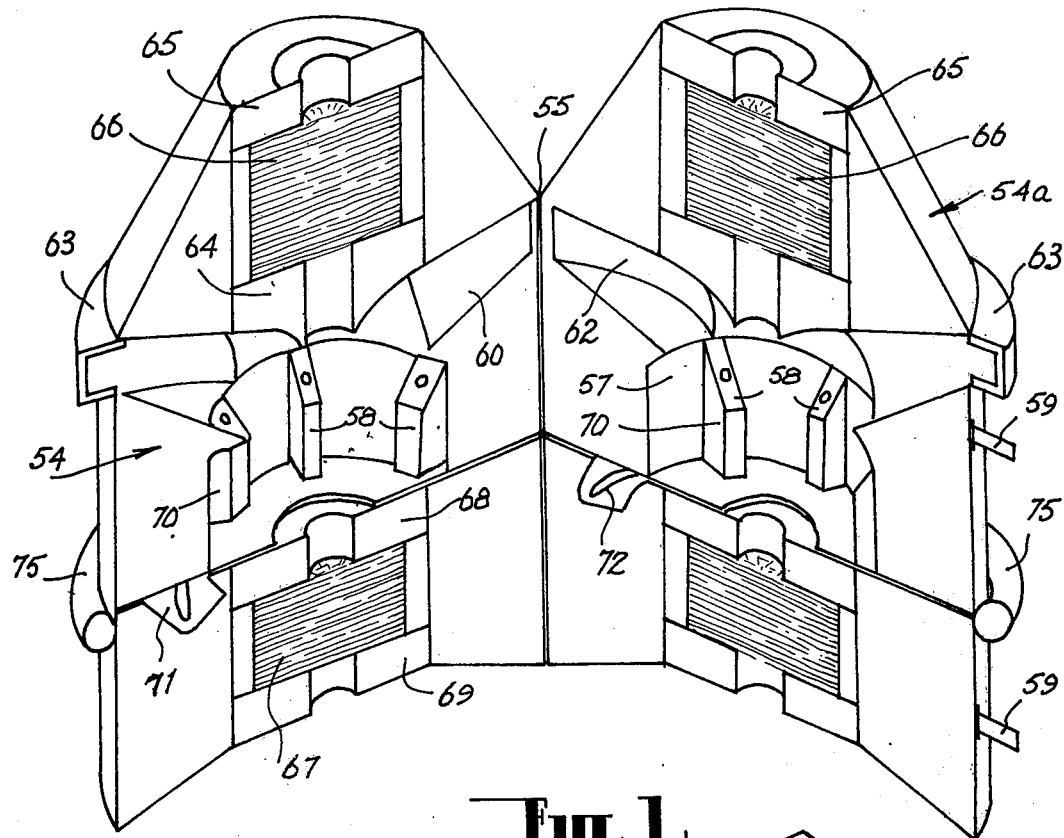
FIG. 1 shows an interior view of one embodiment of the invention, with two halves of the unit hinged apart.
Figure 2:
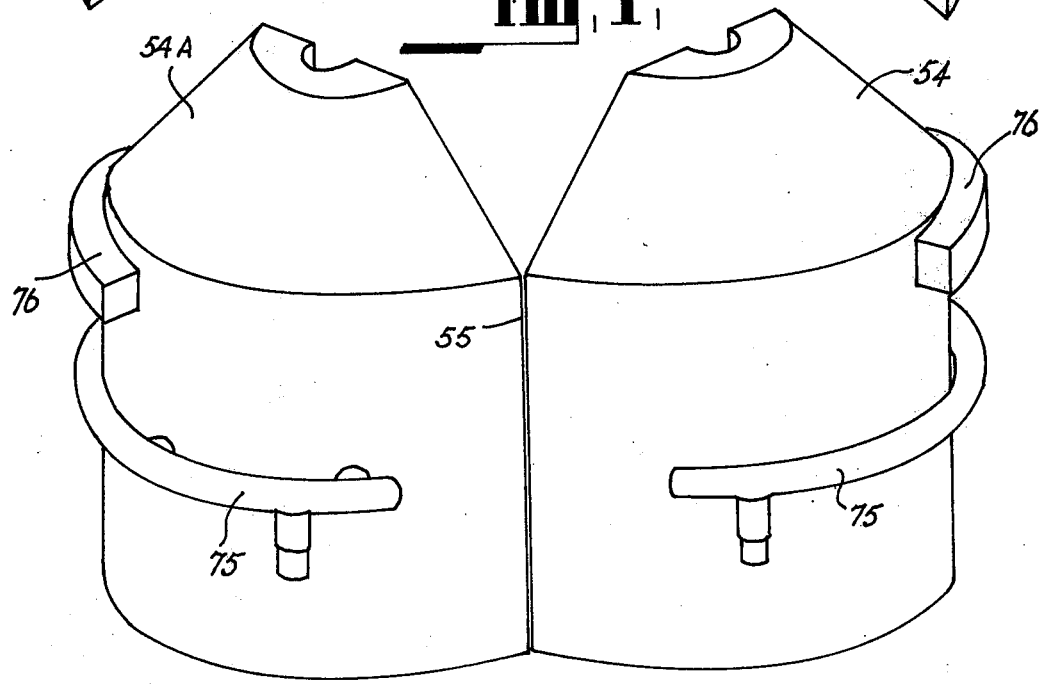
FIG. 2 shows an exterior view of the unit of FIG. 1.
Figure 4:
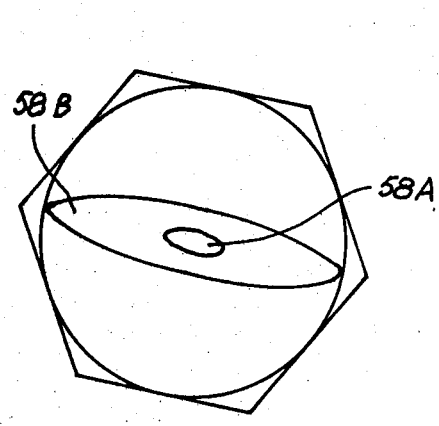
FIG. 4 shows a plan view of a nozzle head.
Figure 5:
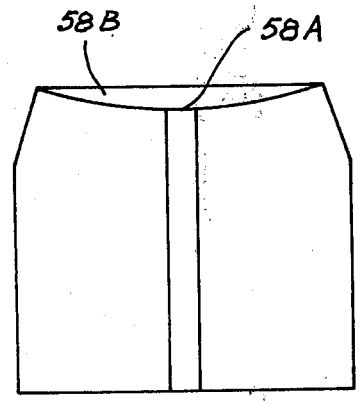
FIG. 5 shows a cross-sectional elevation of the nozzle head.
Figure 6:
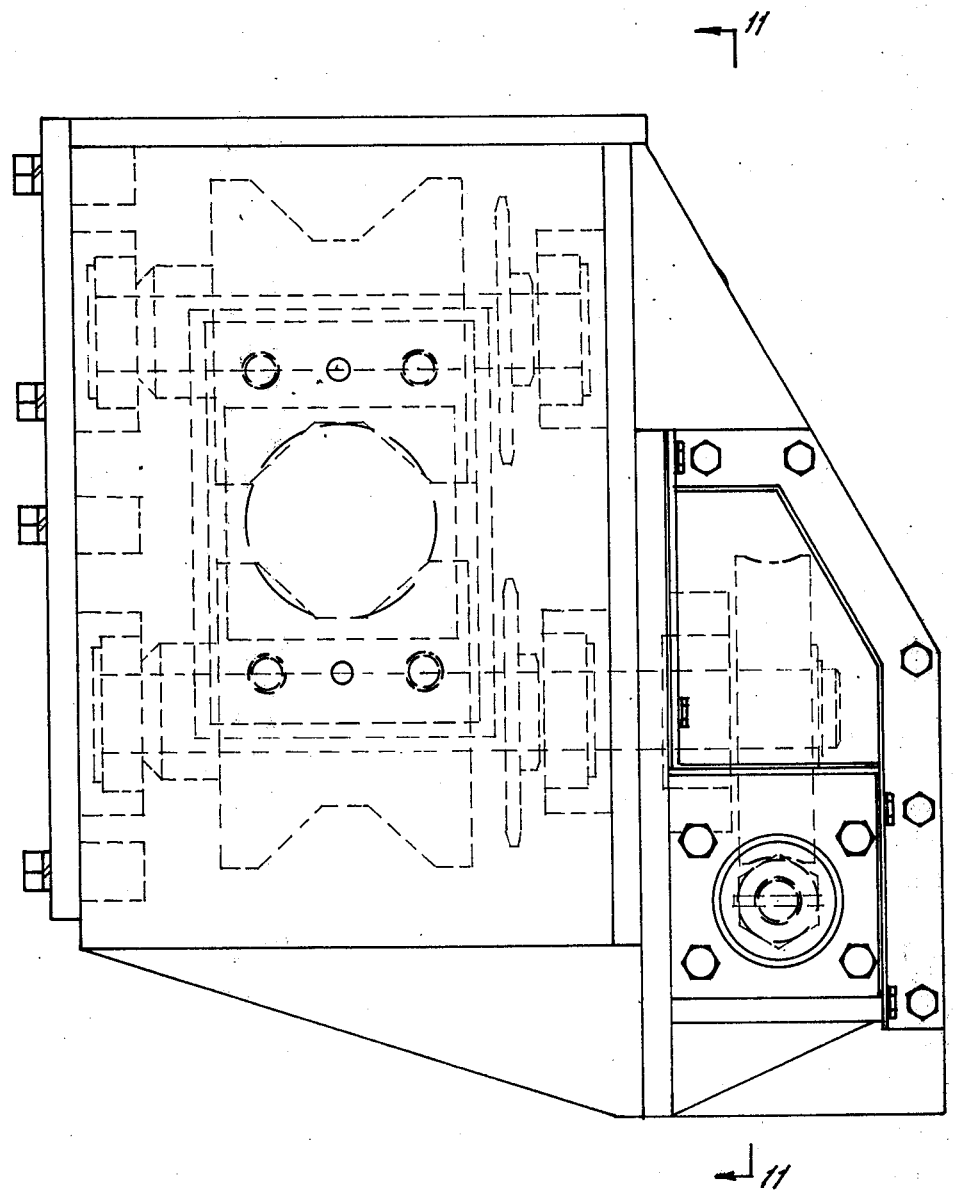
FIG. 6 is an end elevation of a traction unit.
Figure 7:
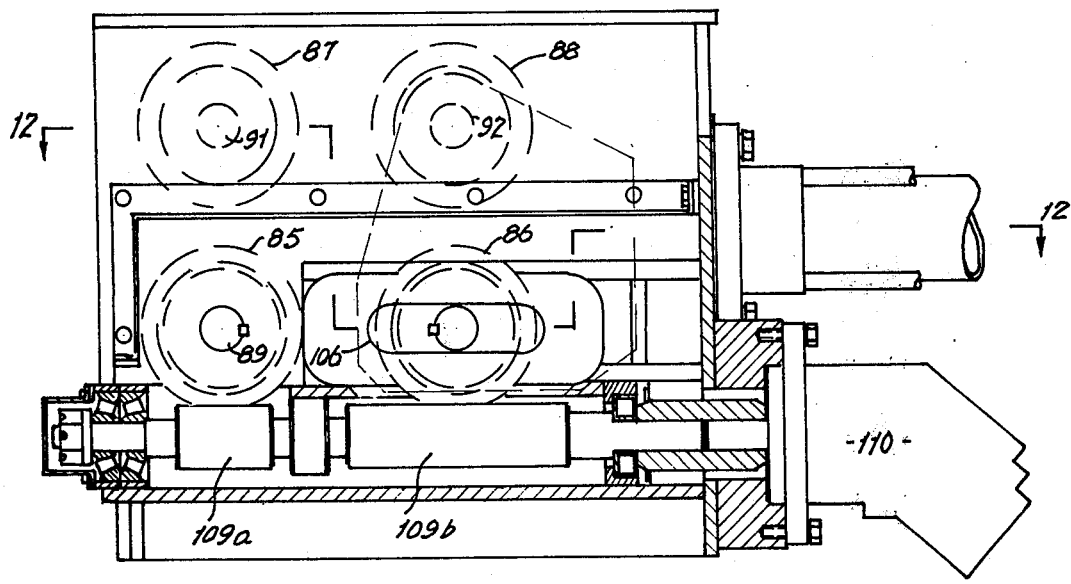
FIG. 7 is a section on line 11—11 of FIG. 6.

In the embodiment shown in FIG. 1, the unit comprises two semi-cylindrical housing parts 54 and 54A hinged together by hinge 55. Each housing part contains one half of an annular inlet chamber 57 containing six nozzles 58. Each nozzle has an oval pinhole 58A and a line drawn through the center of the pinhole normal to the plane of the hole meets the axis of the unit at an acute angle, preferably of 60°. As shown in FIGS. 4 and 5, the nozzle pinhole is surrounded by an elongated groove 58B so that oil emitted from the pinhole fans out. The distance of the nozzle pinholes 58A from a cable passing through a unit is preferably 1 to 1½ inches.

When the two parts of the housing are closed and held together by clips 59, the housing has a frustro-conical leading end, i.e. the relative movement between the cable to be cleaned and the unit is that the cable enters the unit at its narrow end and comes out downstream at the other end of the unit.

Referring again to FIG. 1, a spin-off chamber 60 is provided upstream of the inlet chamber 57. The spin-off chamber 60 contains a plurality of turbo-vanes 62 leading to a common outlet manifold 63. The curvature of the vanes 62 is preferably the known optimum for turbo-blades and the downstream end wall of the chamber 60 is suitably angled. The upstream end wall of the chamber 60 is formed by one side of a plastic locating member 64. Locating members 64 and 65 retain a semi-circular brush element 66. A similar brush element 67 is retained by locating members 68 and 69 downstream of the chamber 60.

Figure 3:
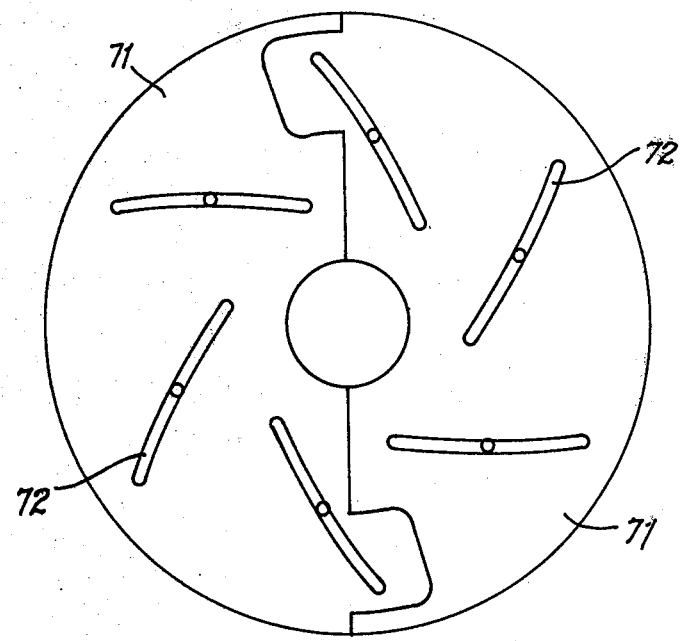
FIG. 3 shows a plan view of nozzle adjusting plates for the unit of FIG. 1.

The nozzles 58 are mounted on nozzle bodies 70 which are slidable on conduits 61 extending radially from the nozzle bodies 70 to an inlet manifold 75. Between the chamber 60 and locating member 68, there is provided a cam plate 71 (FIG. 3) having cam slots 72. Through the cam slots 72, there extend bolts 73 which are screwed at 73d into the nozzle bodies. Each bolt carries a slidable collet 73a having an axial portion to slide in a cam slot 72 and an integral radially extending collar 73c. A spring 74 is retained between the head of the bolt 73e and the collar 73c on the side of the cam plate 71 remote from the nozzle body 70 to urge the collar 73c into engagement with the cam plate 71. When the cam plate 71 is rotated, the nozzle bodies 70 are moved radially towards or away from the axis of the unit via guide slot 75 in lower housing body 54.

The brush elements 66 and 67 may be made of nylon but are preferably made of pure bristle which has better wear and flexibility. When the brushes are closed around the cable, they act as seals at each end of the unit and the brush elements 67 also act as lubricating wipers. The cleaning unit can preferably accommodate cables of from ½ inch to 3 inches diameter, the brush elements being capable of accommodating various sizes of cable. If a specific size of brush is used for a smaller cable, it can still be used for larger cables when it has worn.

The housing parts of the cleaning unit are preferably made of aluminium or stainless steel.

In order to clean a cable, the cleaning unit is clamped to the cable and moved relative thereto. An engine of, for example, 1700 or 2000 cc. drives a hydraulic pump which feeds oil at a pressure of preferably from 2000 to 4000 p.s.i. and a delivery rate of, for example, 12 g.p.m. to two inlet manifolds 75. The oil is emitted from the nozzles and full peripheral cleaning coverage is given by the six nozzles and the fan effect of the nozzle openings. Oil and impurities cleaned off the cable are reflected from the cable into the spin-off chamber and are guided by the turbo-vanes 62 to an outlet manifold 76. From the outlet manifold 76, oil and impurities are fed to a coarse strainer to remove larger impurities and then to a three-stage filter. From the filter, oil and smaller impurities are drawn by a pump and then pumped to a cartridge filter where impurities down to 15 microns are removed. The oil is then returned to a sump where it is again drawn off by the hydraulic pump and fed to the inlet manifolds. The three stage filter has an inlet at its lower end and an outlet at its upper end. Oil is fed upwards through the three stages. The preferred cleaning oil is Castrol Hyspin AWS 46 with additives for anti-foaming and for reducing heat.

The dimensions of the cleaning unit are preferably 18 inches long, 12 inches outside diameter, a nozzle chamber depth of two inches to 5 inches, e.g. three inches, and the angle of the wall between the nozzle and spin-off chamber of 45° to 60°, e.g. 50°, to an axial plane through the unit.

Figure 8:
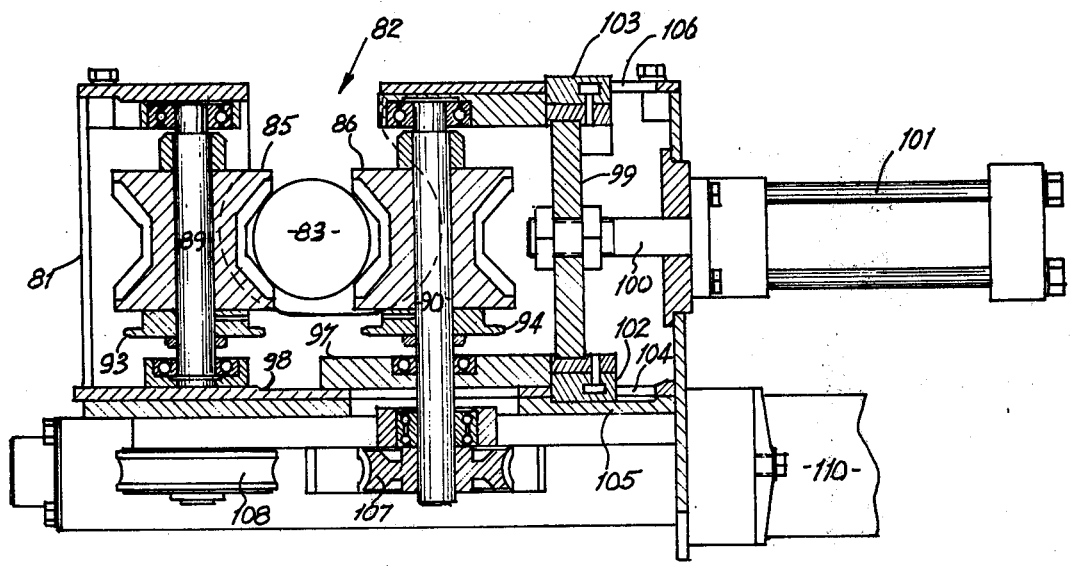
FIG. 8 is a section on line 12—12 of FIG. 7.
Figure 9:
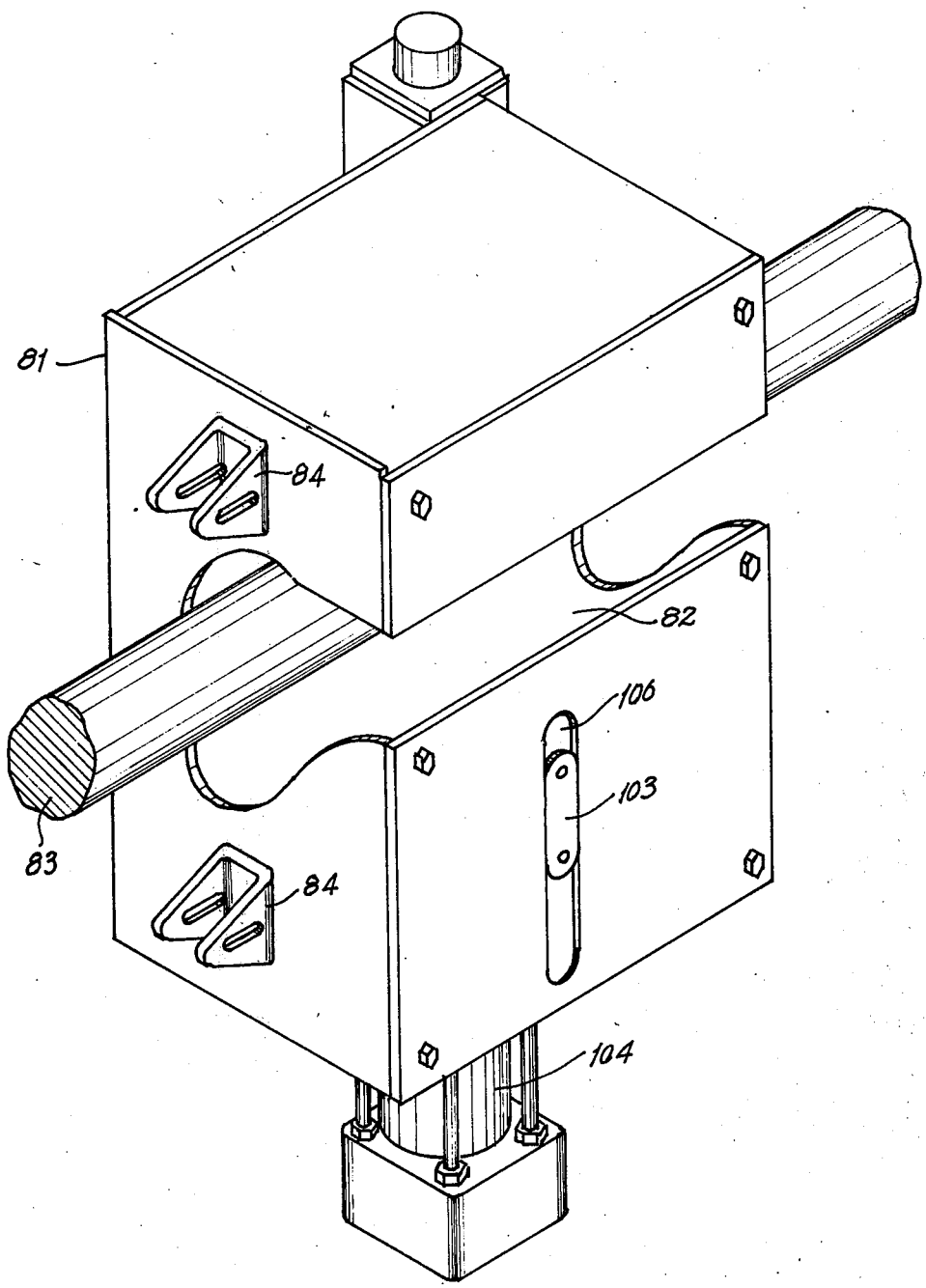
FIG. 9 is a perspective view of the unit positioned on a length of cable.
Figure 10:
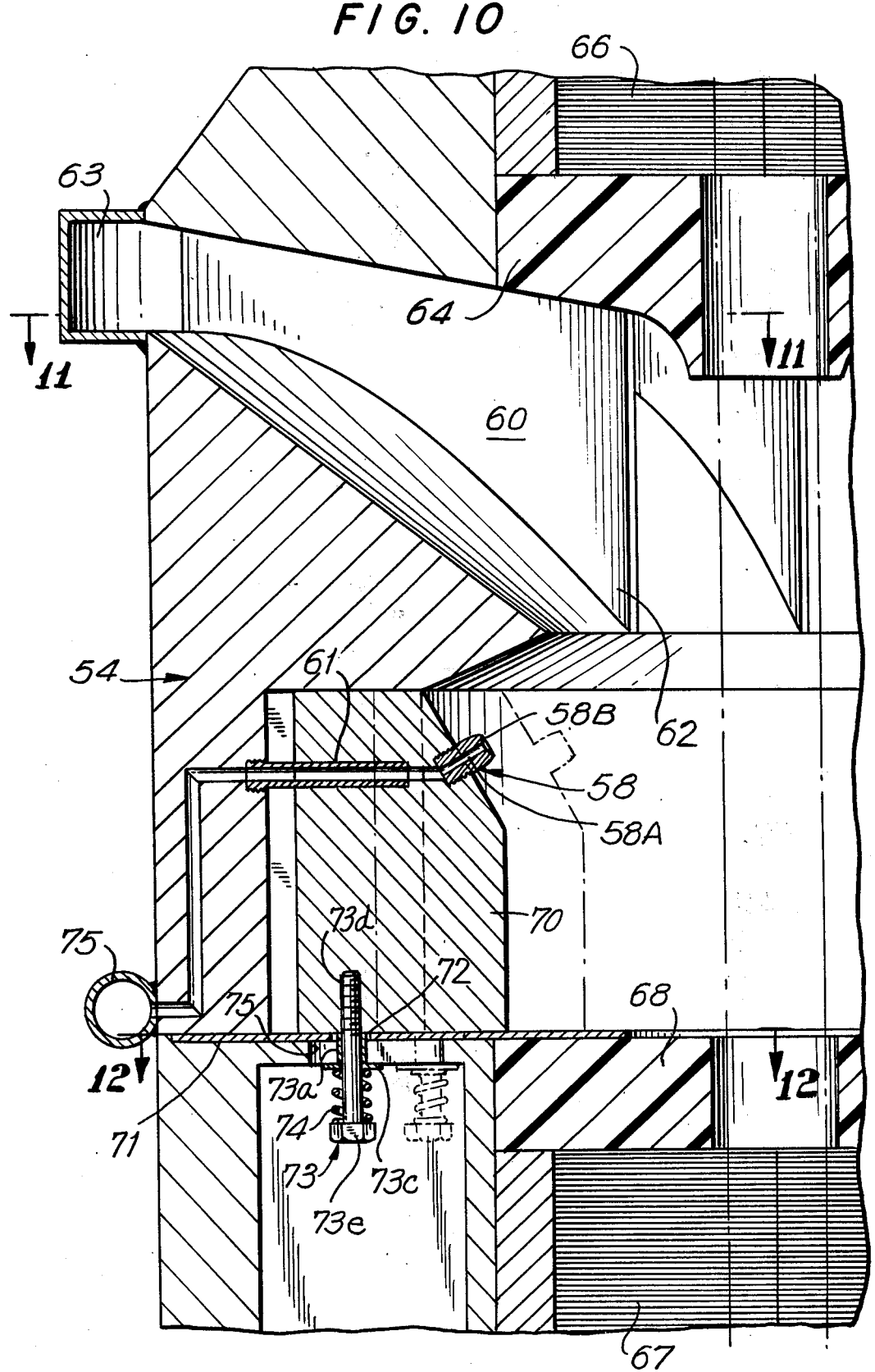
FIG. 10 is a partial vertical cross-section through a portion of the housing as shown in FIG. 1.
Figure 11:
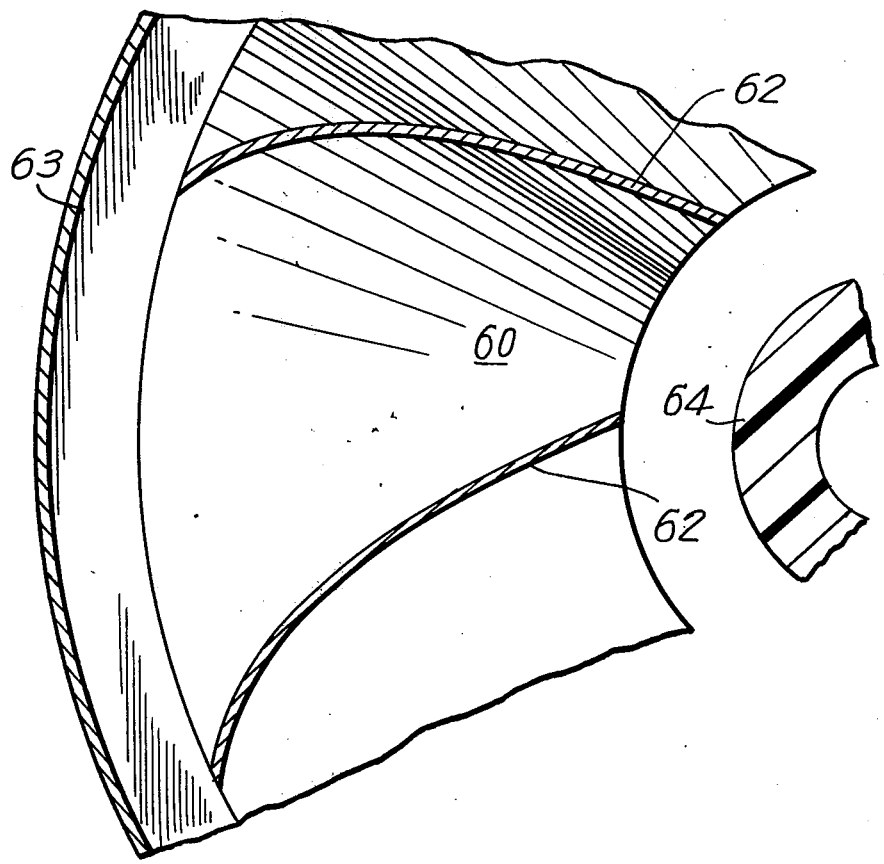
FIG. 11 is a horizontal cross-sectional view taken substantially along the line 11—11 of FIG. 10.
Figure 12:
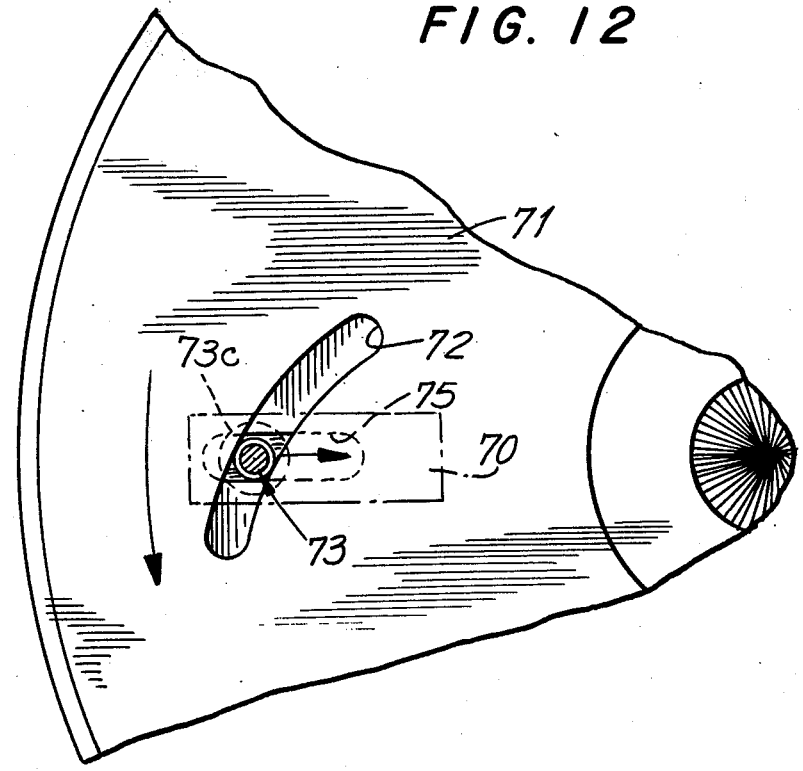
FIG. 12 is a horizontal cross-sectional view taken substantially along the line 12—12 of FIG. 10.

As shown in FIGS. 6 to 9 of the drawings, the traction unit comprises a housing 81 having a mouth 82 (see FIG. 9) so that it can be fitted over a cable 83. One end of the housing is provided with brackets 84 so that cable cleaning and/or oiling equipment can be attached thereto. Two pairs of grooved cable engaging rollers 85 and 86, and 87 and 88 are positioned within the housing, one roller of each pair being disposed on opposite sides of the mouth as is best seen in FIG. 8 of the drawings. Each roller is mounted on a shaft 89, 90, 91 and 92, each end of which is supported in suitable bearings. Each shaft has a sprocket 93, 94 mounted thereon so that it will rotate with the associated roller, the sprockets 93 and 94 each being linked by an endless chain (not shown). The shafts are supported in plates 97, 98 (see FIG. 8) slidably mounted within the housing and attached to a transverse plate 99, which is attached to the outer end of a piston rod 100 of a hydraulic ram 101 projecting from the bottom of the housing. The plate 99 is fitted at each end with blocks 102 and 103. The block 102 is slidably mounted in a guide recess 104 in an intermediate wall 105 within the housing while the block 103 slides in a slot 106 in an outer wall of the housing. The ends of the shafts 89 and 90 are fitted with worm wheels 107, 108 each of which meshes with one section of a pinion 109 rotatably mounted on one side of the housing and driven by a hydraulic motor 110. The section 109b of the pinion is longer than the other section 109a so that irrespective of the position of the shaft 90, the worm wheel 107 will remain in mesh therewith. The thread on section 109b is in the opposite direction to the thread on section 109a so that the grooved cable engaging members 85 and 87 rotate in the opposite direction to the grooved cable engaging members 86 and 88.

In operation, the hydraulic ram 101 is operated to move the cable engaging members 86 and 88 away from the members 85 and 87 and the unit positioned by entering the cable through the mouth 82. The ram 101 is then reversed so that the cable is clamped between the members 85 and 86 and 87 and 88. The hydraulic motor is then operated to move the unit along the cable.

The terms "horizontal" and "vertical" used herein in relation to the traction unit have been used solely to describe the relative positions of the various components and it will be appreciated that in use the positions of such components will vary according to the position of the traction unit.

We claim:

1. A cable cleaning apparatus employing a chamber surrounding a section of a cable to be cleaned, said chamber having a cleaning fluid inlet space, a plurality of nozzles within said space for directing jets of high pressure oil onto the surface of the cable at an acute angle, said apparatus including: means for communicating with said nozzles for supplying cleaning fluid thereto; positioning means for positioning said nozzles in a designated radial direction; a spin-off space adjacent to said inlet space and upstream thereof in relation to the entering side of the cable into the unit and in open communication with said inlet space, said spin-off space being adapted to receive oil and impurities from the cable, and a common outlet manifold from said apparatus arranged circumferentially in a side wall of said spin-off space at the upstream end thereof, said spin-off space having a plurality of turbo-vanes directing the oil and impurities to said common outlet manifold.

2. A cable cleaning apparatus as claimed in claim 1 wherein: each nozzle being provided with an oval pinhole orifice and the respective nozzles being located so that a line drawn through the center of the pinhole normal to the plane of the hole meets the axis of the unit at an acute angle upstream of the nozzle, said pinhole being surrounded by an elongated concave groove in the end face of the nozzle body containing the nozzle pinhole to cause oil emitting from the pinhole to fan out.

3. A cable cleaning apparatus as claimed in claim 1 wherein: each nozzle being defined by an oval pinhole orifice and the respective nozzles being located so that a line drawn through the center of the pinhole normal to the plane of the hole meets the axis of the unit at an acute angle of 60° upstream of the nozzle, said pinhole being surrounded by an elongated concave groove in the end face of the nozzle body containing the nozzle pinhole to cause oil emitting from the pinhole to fan out.

4. A cable cleaning apparatus as claimed in claim 3, including: a common inlet manifold surrounding said apparatus, the nozzles being mounted on nozzle bodies, each nozzle body having a cleaning fluid supply channel communicating with the nozzle and the nozzle bodies being telescopically slidable on conduits extending radially from the nozzle bodies to said common inlet manifold surrounding the apparatus, each nozzle body being connected to a rotatable cam plate with cam slots by bolts slidably fitting into said cam slots, said slots being shaped so that by rotation of said plate, the nozzle bodies are movable radially inwardly and outwardly.

5. A cable cleaning apparatus as claimed in claim 1, including: a common inlet manifold surrounding said apparatus, the nozzles being mounted on nozzle bodies, each nozzle body having a cleaning fluid supply channel communicating with the nozzle and the nozzle bodies being telescopically slidable on conduits extending radially from the nozzle bodies to said common inlet manifold surrounding said apparatus, each nozzle body being connected to a rotatable cam plate with cam slots by bolts slidably fitting into said cam slots, said slots being shaped so that by rotation of said plate, the nozzle bodies are movable radially inwardly and outwardly.

* * * * *